United States Patent
Kim

(10) Patent No.: US 12,517,349 B2
(45) Date of Patent: Jan. 6, 2026

(54) OPTICAL LENS AND CAMERA MODULE COMPRISING SAME

(71) Applicant: LG INNOTEK CO., LTD., Seoul (KR)

(72) Inventor: Tae Kyung Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 570 days.

(21) Appl. No.: 17/997,314

(22) PCT Filed: Apr. 29, 2021

(86) PCT No.: PCT/KR2021/005482
§ 371 (c)(1),
(2) Date: Oct. 27, 2022

(87) PCT Pub. No.: WO2021/221483
PCT Pub. Date: Nov. 4, 2021

(65) Prior Publication Data
US 2023/0168492 A1    Jun. 1, 2023

(30) Foreign Application Priority Data

Apr. 29, 2020    (KR) .................... 10-2020-0052941

(51) Int. Cl.
*G02B 27/00*    (2006.01)
*G02B 1/10*    (2015.01)
*G02B 13/00*    (2006.01)
*G02B 30/00*    (2020.01)

(52) U.S. Cl.
CPC .......... *G02B 27/0018* (2013.01); *G02B 1/10* (2013.01); *G02B 13/001* (2013.01); *G02B 30/00* (2020.01)

(58) Field of Classification Search
CPC .... G02B 27/0018; G02B 13/001; G02B 1/10; G03B 30/00
See application file for complete search history.

(56) References Cited

U.S. PATENT DOCUMENTS

| | | | |
|---|---|---|---|
| 5,541,779 A | 7/1996 | Choi | |
| 2007/0139792 A1 | 6/2007 | Sayag | |
| 2019/0179103 A1 | 6/2019 | Yang et al. | |
| 2019/0361205 A1* | 11/2019 | Wolterink | G02B 13/0085 |

FOREIGN PATENT DOCUMENTS

| | | | | |
|---|---|---|---|---|
| CN | 1837942 A | 9/2006 | | |
| CN | 113960757 B | * 7/2023 | ......... | G02B 13/004 |
| JP | 7-198908 A | 8/1995 | | |
| JP | 7-253532 A | 10/1995 | | |

(Continued)

OTHER PUBLICATIONS

Translation of JPH10268382A (Year: 1997).*

*Primary Examiner* — Lucy P Chien
(74) *Attorney, Agent, or Firm* — Birch, Stewart, Kolasch & Birch, LLP

(57) ABSTRACT

The present invention relates to an optical lens comprising at least one straight part and at least one curved part on the outer surface thereof, in which an apodization area for reducing a flare phenomenon is disposed at an edge adjacent to the straight part. The optical lens has the advantage of reducing flare and ghosting phenomena due to a diffraction effect of the apodization area in the edge region.

16 Claims, 7 Drawing Sheets

(56) References Cited

FOREIGN PATENT DOCUMENTS

| | | | |
|---|---|---|---|
| JP | 2005266096 A * | 9/2005 | ............. G02B 27/58 |
| JP | 2006-145831 A | 6/2006 | |
| JP | 2006-267391 A | 10/2006 | |
| JP | 2011-22427 A | 2/2011 | |
| JP | 2011-43679 A | 3/2011 | |
| JP | 2011-221120 A | 11/2011 | |
| JP | 2014-211617 A | 11/2014 | |
| JP | 2015-94911 A | 5/2015 | |
| JP | 2016-95485 A | 5/2016 | |
| JP | 2017-156644 A | 9/2017 | |
| KR | 10-2008-0087005 A | 9/2008 | |
| KR | 10-2010-0001079 A | 1/2010 | |
| KR | 10-2019-0070231 A | 6/2019 | |
| WO | WO 2007/075826 A2 | 7/2007 | |
| WO | WO 2016/039147 A1 | 3/2016 | |

\* cited by examiner

FIG. 10

| Apodization Area C | Brightness Ratio According to the Apodization Area |
|---|---|
| C=0 | 1.00 |
| C=0.05A | 0.97 |
| C=0.1A | 0.93 |
| C=0.15A | 0.89 |
| C=0.2A | 0.84 |
| C=0.25A | 0.79 |
| C=0.3A | 0.73 |
| C=0.35A | 0.68 |
| C=0.4A | 0.62 |
| C=0.45A | 0.56 |
| C=0.5A | 0.50 |

FIG. 11

| | Flare Simulation | Apodization Area C | Flare Simulation | Apodization Area C | Flare Simulation |
|---|---|---|---|---|---|
| C=0 | | C=0.2A | | C=0.4A | |
| C=0.05A | | C=0.25A | | C=0.45A | |
| C=0.1A | | C=0.3A | | C=0.5A | |
| C=0.15A | | C=0.35A | | | |

FIG. 12

| D-cut Ratio ($\alpha$) | Normal Lens (Diameter A) Brightness Ratio to D-cut Lens (@C=0) | Apodization Area Thickness Limit (C_limit) |
|---|---|---|
| 0.9 | 0.84 | 0.2A |
| 0.8 | 0.71 | 0.32A |
| 0.7 | 0.6 | 0.4A |
| 0.6 | 0.50 | 0.5A |
| 0.5 | 0.41 | 0.5A |

OPTICAL LENS AND CAMERA MODULE COMPRISING SAME

CROSS REFERENCE TO RELATED APPLICATIONS

This application is the National Phase of PCT International Application No. PCT/KR2021/005482, filed on Apr. 29, 2021, which claims priority under 35 U.S.C. § 119 (a) to Patent Application No. 10-2020-0052941, filed in the Republic of Korea on Apr. 29, 2020, all of which are hereby expressly incorporated by reference into the present application.

TECHNICAL FIELD

The present embodiment relates to an optical lens and a camera module comprising the same.

BACKGROUND ART

Recently, a miniature camera has been widely used in portable devices, and the miniature camera includes a function of photographing a video as well as a digital image.

The camera module comprises an image sensor, a lens barrel for accommodating a camera lens facing the image sensor, a voice coil motor (VCM) for narrowing or widening a gap between the camera lens and the image sensor, and an aperture.

In general, a camera lens includes three or four optical lenses being overlappingly disposed.

At least one of the optical lenses may be a D-cut lens having a straight part in which one side is cut out.

FIG. 1 is a cross-sectional view of a D-cut lens according to the prior art, and FIG. 2 is a view illustrating an image measured through the D-cut lens of FIG. 1.

Referring to FIGS. 1 and 2, the D-cut lens 10 according to the prior art may have a straight part 12 of a shape in which one side is cut out. For example, the D-cut lens 10 may include a plurality of mutually facing curved parts 14 and a plurality of mutually opposed straight parts 12. The straight part 12 may be formed by partially cutting out a circular lens.

In a camera module to which a prism or mirror is applied, the above described D-cut lens may be applied to at least one optical lens among a plurality of optical lenses to reduce module height or Fno.

However, as illustrated in FIG. 2, due to the shape of the D-cut lens itself, there is a problem in that a flare phenomenon or a ghost occurs when light is reflected through the D-cut lens.

DETAILED DESCRIPTION OF THE INVENTION

Technical Subject

The present embodiment is to provide an optical lens capable of reducing the occurrence of flare or ghost by improving the structure and a camera module comprising the same.

Technical Solution

As an embodiment, in an optical lens including at least one straight part and a curved part on an outer surface thereof, an apodization area for reducing a flare phenomenon is disposed in an edge adjacent to the straight part of the optical lens.

The apodization area may include a plurality of areas having different light transmittances.

The apodization area may be formed to have a lower light transmittance as it travels toward an edge.

The apodization area is an area coated with ink on the surface thereof, and the area coated may become thicker as it travels toward the edge.

The apodization area is an area in which a plurality of patterns are disposed to be spaced apart from one another, and the cross-sectional shape of the pattern may include any one among a circular shape, an elliptical shape, and a polygonal shape.

The pattern may be formed to have a larger size as it travels toward the edge.

The gap between adjacent patterns may become closer as it travels toward the edge of the optical lens.

The straight part is provided in plurality and disposed to face one another with respect to the center, and the curved part is provided in plurality and may be disposed to face one another with respect to the center.

Assuming that the linear distance between the plurality of straight parts is A and the thickness of the apodization area defined in a direction perpendicular to the straight part is C, it may be $0.05*A \leq C \leq 0.5*A$.

Assuming that the linear distance between the plurality of straight parts is A, and the maximum linear distance B between the plurality of curved parts is B, it may be $A = \alpha * B$, $(0.3 \leq \alpha \leq 0.9)$.

Advantageous Effects

Through the present embodiment, there is an advantage in that the flare and ghost phenomena can be reduced due to the diffraction effect of the apodization area in an edge area of the optical lens.

BRIEF DESCRIPTION OF DRAWINGS

FIGS. 8 to 12 are diagrams for explaining light transmittance according to an arrangement structure of an apodization area in an optical lens according to an embodiment of the present invention.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention. In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used.

These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under) ", the meaning of not only an upward direction but also a downward direction based on one component may be included.

Figure 1:
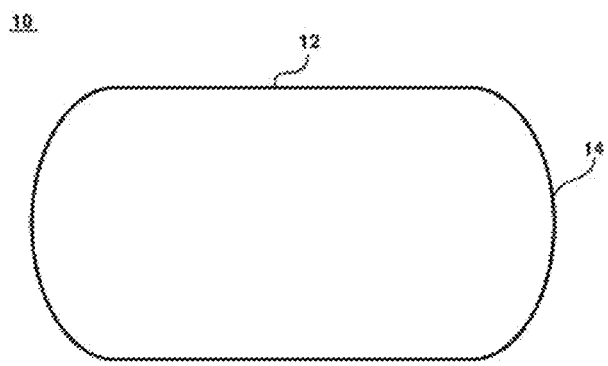
FIG. 1 is a cross-sectional view of a D-cut lens according to the prior art.
Figure 2:
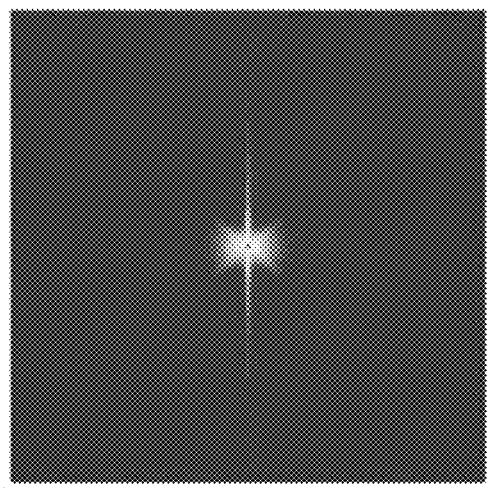
FIG. 2 is a view illustrating an image being measured through the D-cut lens of FIG. 1.
Figure 3:
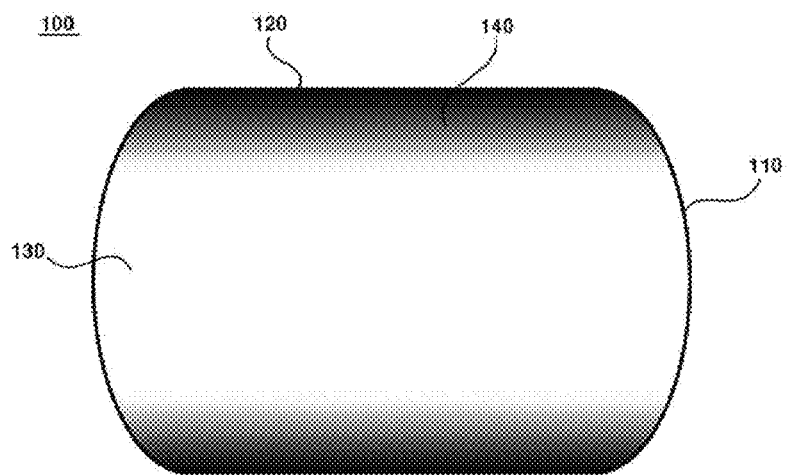
FIG. 3 is a cross-sectional view of an optical lens according to an embodiment of the present invention.
Figure 4:
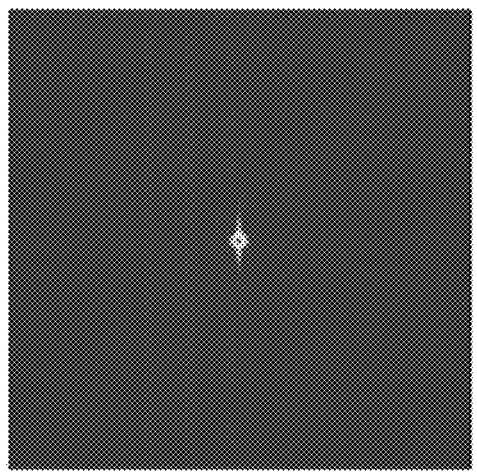
FIG. 4 is a view illustrating an image measured through an optical lens according to an embodiment of the present invention.
Figure 5:
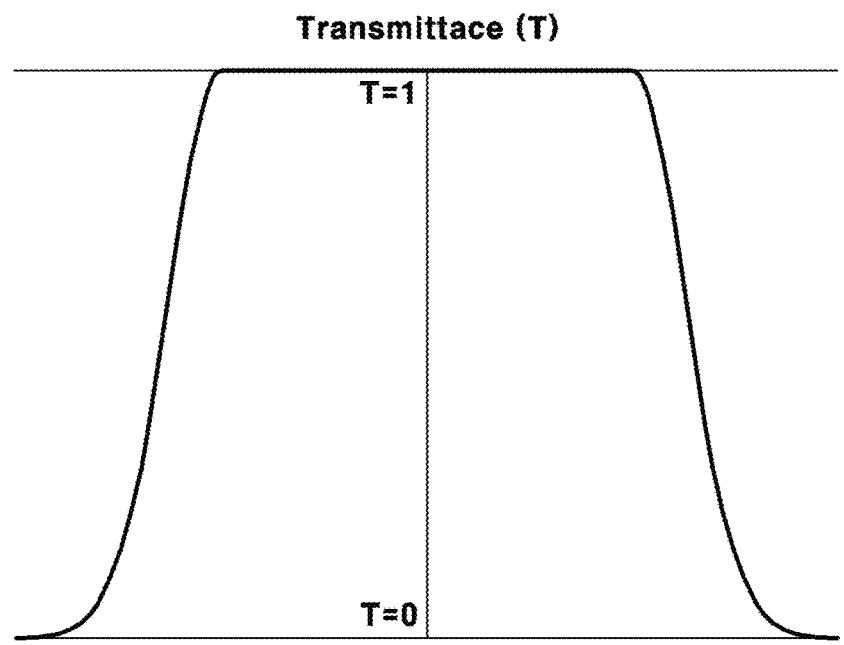
FIG. 5 is a graph illustrating transmittance for each position of an optical lens according to an embodiment of the present invention.
Figure 6:
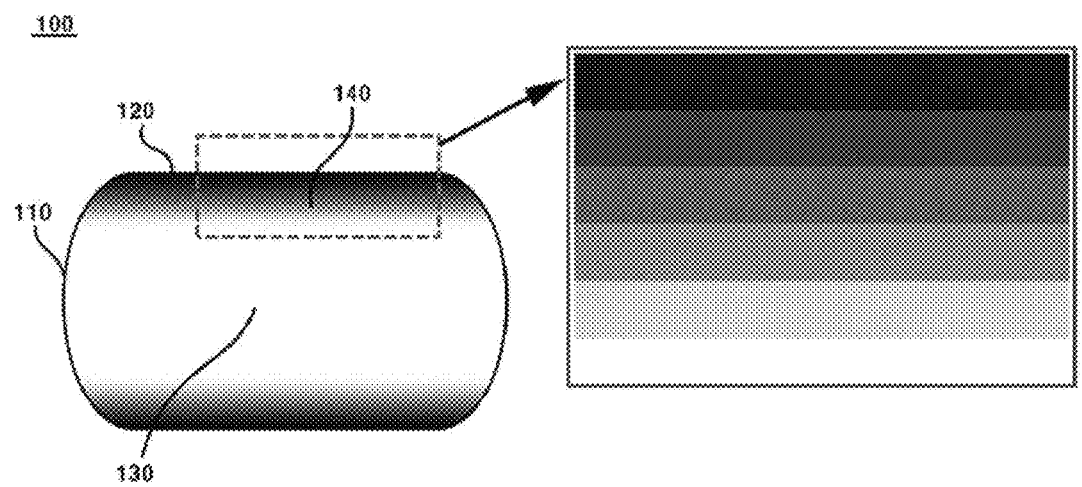
FIG. 6 is an enlarged view of an apodization area in an optical lens according to an embodiment of the present invention.

FIG. 3 is a cross-sectional view of an optical lens according to an embodiment of the present invention; FIG. 4 is a view illustrating an image measured through an optical lens according to an embodiment of the present invention; FIG. 5 is a graph illustrating transmittance for each position of an optical lens according to an embodiment of the present invention; and FIG. 6 is an enlarged view of an apodization area in an optical lens according to an embodiment of the present invention.

Referring to FIGS. 3 to 5, the optical lens 100 according to an embodiment of the present invention may be a D-cut lens. The optical lens 100 may include at least one curved part 110 and at least one straight part 120. The optical lens 100 may have a shape in which one side of a circular lens is cut out. The cut out area may form the straight part 120.

The end portion of the curved part 110 may be formed in the shape of a curved line. The end portion of the straight part 120 may be formed in the shape of a straight line. The curved part 110 and the straight part 120 may be disposed in an edge area of the optical lens 110. A plurality of the curved part 110 may be disposed to face one another. The straight part 120 may be provided in plurality and disposed to face one another. The curved part 110 and the straight part 120 may be disposed adjacent to one another. The outer surface of the optical lens 110 may have a shape in which the curved part 110 and the straight part 120 are alternately disposed.

The length of the straight part 120 may be formed to be longer than the length of the curved part 110. Unlike this, the length of the curved part 110 may be formed to be longer than the length of the straight part 120.

The optical lens 110 may include an apodization area 140. The apodization area 140 may be formed on a surface of the optical lens 110. The apodization area 140 may be disposed on an incident surface or an exit surface of the optical lens 110. The apodization area 140 may be disposed at an edge of the optical lens 110.

The apodization area 140 may be disposed in an edge area of the optical lens 110 adjacent to the straight part 120. The apodization area 140 may be disposed at an inner side of the straight part 120. When the straight part 120 is provided in plurality, the apodization area 140 may be provided in plurality so as to face one another with respect to the center of the optical lens 110.

In some cases, at least a portion of the apodization area 140 may be disposed at an inner side of the curved part 110. That is, the central portion of the apodization area 140 may be disposed at an inner side of the straight part 120, and both end portions may be disposed at an inner side of the curved part 110.

The apodization area 140 may have a predetermined thickness with respect to the height of the optical lens 110. Here, the height of the optical lens 110 may be defined as the length in an up and down direction between the plurality of straight parts 120.

As illustrated in FIG. 6, the apodization area 140 may include a plurality of areas having different light transmittances from one another. The apodization area 140 may be formed to have a lower light transmittance as it travels toward the edge of the optical lens 110.

The apodization area 140 is a process for reducing a higher-order diffraction image, and a diffraction effect in the edge area of the optical lens 110 may be reduced. The apodization area 140 may be treated as a coating on a surface of the optical lens 110. The apodization area 140 may be an area coated with ink on a surface of the optical lens 110. To form an apodization area 140 as shown in FIG. 6, the coating area may be formed to be thicker as it travels toward the edge of the optical lens 110. In addition, the apodization area 140 may be coated with a relatively darker ink as it travels toward the edge of the optical lens 110.

Meanwhile, the apodization area 140 may be implemented through a separate mechanism attached to a surface of the optical lens 110. For example, the separate mechanism may include a spacer.

According to the above structure, as illustrated in FIG. 4, a flare phenomenon due to a diffraction effect in an edge region of the optical lens 100 can be reduced.

In addition, as illustrated in FIG. 5, it is possible to prevent abrupt change in the light transmittance in an edge area (an area where the straight part 120 is disposed) of the optical lens 100. In other words, since the airy disk size of the optical lens 100 is reduced due to the apodization area 140, the diffraction effect may also be reduced.

Figure 7:
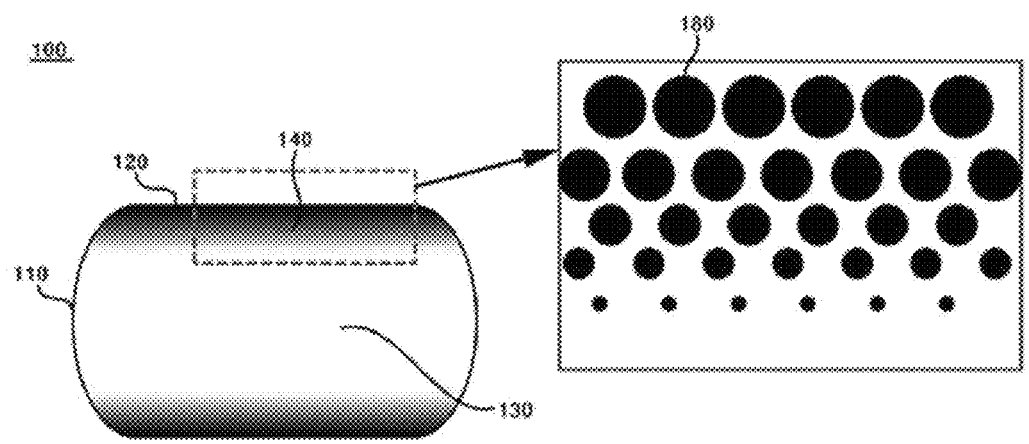
FIG. 7 is a view illustrating a modified embodiment of an apodization area according to an embodiment of the present invention.

FIG. 7 is a view illustrating a modified embodiment of an apodization area according to an embodiment of the present invention.

Referring to FIG. 7, the apodization area 140 may be an area in which a plurality of patterns 180 is combined. The cross-sectional shape of the pattern 180 may include any one among a circular shape, an elliptical shape, and a polygonal shape. The pattern 180 may be formed to have a larger size as it travels toward the edge of the optical lens 100. In addition, a gap between adjacent patterns 180 may be formed to be closer as it travels toward the edge of the optical lens 100.

FIGS. 8 to 12 are views for explaining light transmittance according to an arrangement structure of an apodization area inside an optical lens according to an embodiment of the present invention.

Figure 8:
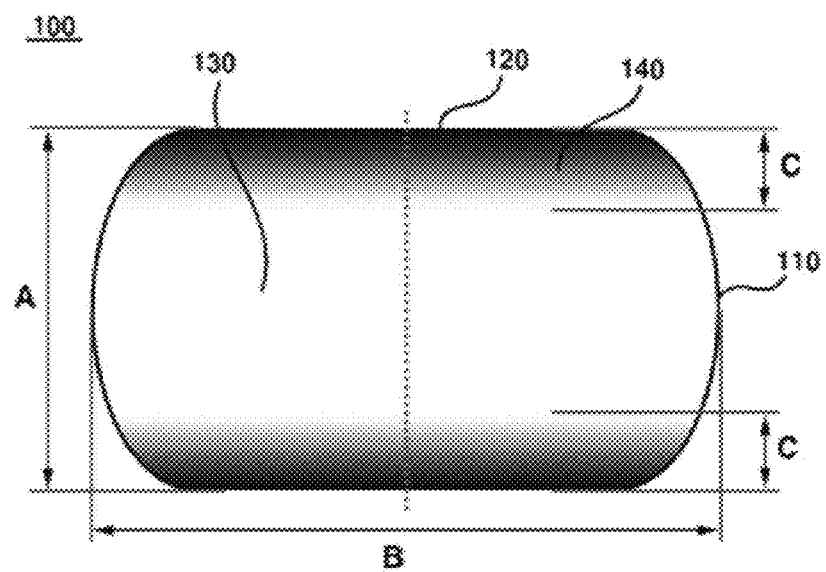

Referring to FIG. 8, the length of each area of the optical lens 100 may be defined as follows.

A: The linear distance between a plurality of straight parts 120 (size of optical lens)
B: The maximum linear distance between a plurality of the curved parts 110 (effective diameter of optical lens)
C: The thickness of the apodization area 140 measured in a direction perpendicular to the straight part 120

Figure 9:
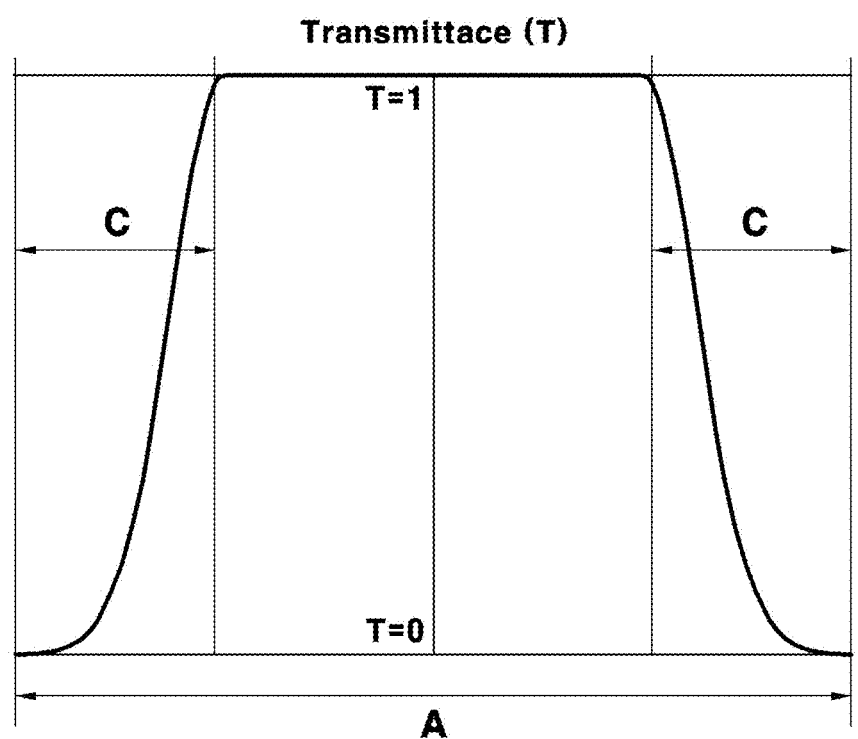

Referring to FIG. 9, assuming that the transmittance in the central area of the optical lens 100 excluding the apodization area 140 is 1, and assuming that the transmittance in areas other than the optical lens 100 is 0, as described above, it can be confirmed that the light transmittance is continuously decreased or increased in the apodization area 140.

In addition, referring to the graph of FIG. 10 illustrating the brightness ratio of the optical lens 100 according to the size of C, when the thickness of the apodization area 140 satisfies the range of $0.05*A \leq C \leq 0.5*A$, it can be confirmed that the flare phenomenon can be prevented and the brightness within the desired range can be obtained. The simulation result of the optical lens 100 according to the above-described range of C is as shown in FIG. 11. That is, when the thickness of the apodization area 140 is increased more than necessary, the light transmittance of the optical lens 100 becomes very low, so the flare phenomenon prevention range in consideration of the light transmittance is the same as above.

In addition, the linear distance A between the plurality of straight parts 120 and the maximum linear distance B between the plurality of curved parts 110 may satisfy the following relational expression.

$$A = \alpha*B, (0.3 \leq \alpha \leq 0.9)$$

where, α may be a D-cut ratio. That is, when α is within the above range compared to a circular lens, which is a normal lens, with the diameter of A, since the optical lens 100 has a satisfactory brightness ratio compared to the circular lens (refer to FIG. 12), the linear distance A between the plurality of straight parts 120 and the maximum linear distance B between the plurality of curved parts 110 may have the above relationship.

In the above description, it is described that all the components constituting the embodiments of the present invention are combined or operated in one, but the present invention is not necessarily limited to these embodiments. In other words, within the scope of the present invention, all of the components may be selectively operated in combination with one or more. In addition, the terms "comprise", "include" or "having" described above mean that the corresponding component may be inherent unless specifically stated otherwise, and thus it should be construed that it does not exclude other components, but further include other components instead. All terms, including technical and scientific terms, have the same meaning as commonly understood by one of ordinary skill in the art unless otherwise defined. Terms used generally, such as terms defined in a dictionary, should be interpreted to coincide with the contextual meaning of the related art, and shall not be interpreted in an ideal or excessively formal sense unless explicitly defined in the present invention.

The above description is merely illustrative of the technical idea of the present invention, and those skilled in the art to which the present invention pertains may make various modifications and changes without departing from the essential characteristics of the present invention. Therefore, the embodiments disclosed in the present invention are not intended to limit the technical idea of the present invention but to describe the present invention, and the scope of the technical idea of the present invention is not limited by these embodiments. The protection scope of the present invention should be interpreted by the following claims, and all technical ideas within the equivalent scope should be interpreted as being included in the scope of the present invention.

The invention claimed is:

1. An optical lens comprising at least one straight part and at least one curved part on an outer surface thereof,
wherein an apodization area for reducing a flare phenomenon is disposed at an edge adjacent to the straight part,
wherein the straight part is provided in plurality and disposed to face one another with respect to a center of the optical lens,
wherein the curved part is provided in plurality and is disposed to face one another with respect to the center of the optical lens,
wherein a length of the straight part is longer than a length of the curved part,
wherein a height of the optical lens is defined as a vertical length between the plurality of straight parts,
wherein, when a linear distance between the plurality of straight parts is A and a maximum linear distance B between the plurality of curved parts is B, $$A = \alpha*B, (0.3 \leq \alpha \leq 0.9), \text{ and}$$

wherein the B is an effective diameter of the optical lens.

2. The optical lens according to claim 1, wherein the apodization area includes a plurality of areas having different light transmittances from one another.

3. The optical lens according to claim 2, wherein the apodization area is formed to have a lower light transmittance as it travels toward an edge.

4. The optical lens according to claim 1, wherein the apodization area is an area coated with ink on the surface thereof, and
wherein the area coated becomes thicker as it travels toward the edge.

5. The optical lens according to claim 1, wherein the apodization area is an area in which a plurality of patterns are disposed to be spaced apart from one another, and
wherein the cross-sectional shape of the pattern includes any one among a circular shape, an elliptical shape, and a polygonal shape.

6. The optical lens according to claim 1, wherein the pattern is formed to have a larger size as it travels toward the edge.

7. The optical lens according to claim 5, wherein the gap between adjacent patterns becomes closer as it travels toward the edge of the optical lens.

8. The optical lens according to claim 1, wherein when the linear distance between the plurality of straight parts is A and the thickness of the apodization area defined in a direction perpendicular to the straight part is C, $$0.05*A \leq C \leq 0.5*A.$$

9. The optical lens according to claim 1, wherein the straight part and the curved part are disposed adjacent to each other.

10. The optical lens according to claim 1, wherein a central portion of the apodization area is disposed inside the straight part, and
wherein both ends of the apodization area are disposed inside the curved part.

11. The optical lens according to claim 1, wherein the apodization area is an area coated with ink on the surface thereof, and
wherein a color of the ink becomes darker toward an edge of the optical lens.

12. The optical lens according to claim 1, wherein a spacer is disposed on a surface of the apodization area.

13. A camera module comprising:
an image sensor;
an optical lens facing the image sensor and having at least one straight part and a curved part on an outer surface thereof; and
a lens barrel housing the optical lens,
wherein an apodization area for reducing a flare phenomenon is disposed at an edge adjacent to the straight part,
wherein the straight part is provided in plurality and disposed to face one another with respect to a center of the optical lens,
wherein the curved part is provided in plurality and is disposed to face one another with respect to the center of the optical lens,
wherein a length of the straight part is longer than a length of the curved part,
wherein a height of the optical lens is defined as a vertical length between the plurality of straight parts,
wherein, when a linear distance between the plurality of straight parts is A and a maximum linear distance B between the plurality of curved parts is B, $$A=\alpha*B, (0.3\leq\alpha\leq0.9), and$$

wherein the B is an effective diameter of the optical lens.

14. The camera module according to claim 13, wherein the apodization area includes a plurality of areas having different light transmittances from one another.

15. The camera module according to claim 14, wherein the apodization area is formed to have a lower light transmittance as it travels toward an edge.

16. The camera module according to claim 13, wherein the straight part is provided in plurality and disposed to face one another with respect to the center,
wherein the curved part is provided in plurality and is disposed to face one another with respect to the center, and
wherein when the linear distance between the plurality of straight parts is A and the thickness of the apodization area defined in a direction perpendicular to the straight part is C, $$0.05*A\leq C\leq 0.5*A.$$

* * * * *